United States Patent
Vogler et al.

(10) Patent No.: US 11,314,765 B2
(45) Date of Patent: Apr. 26, 2022

(54) MULTISTAGE DATA SNIFFER FOR DATA EXTRACTION

(71) Applicants: Nicholas A. Vogler, Melbourne, FL (US); Evan M. Fleischmann, Melbourne, FL (US); Lea A. Vail, Melbourne, FL (US); Jordan C. Layton, Melbourne, FL (US); Richie Hiatt, Melbourne, FL (US); Jerry James, Melbourne, FL (US)

(72) Inventors: Nicholas A. Vogler, Melbourne, FL (US); Evan M. Fleischmann, Melbourne, FL (US); Lea A. Vail, Melbourne, FL (US); Jordan C. Layton, Melbourne, FL (US); Richie Hiatt, Melbourne, FL (US); Jerry James, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 27 days.

(21) Appl. No.: 16/925,118

(22) Filed: Jul. 9, 2020

(65) Prior Publication Data
US 2022/0012260 A1 Jan. 13, 2022

(51) Int. Cl.
*G06F 16/25* (2019.01)
*G06F 16/11* (2019.01)
(Continued)

(52) U.S. Cl.
CPC ......... *G06F 16/254* (2019.01); *G06F 16/116* (2019.01); *H04L 51/04* (2013.01); *H04L 67/26* (2013.01); *H04W 4/14* (2013.01)

(58) Field of Classification Search
CPC ...... G06F 16/254; G06F 16/116; G06F 51/04; H04L 67/26; H04L 51/04; H04W 4/14
See application file for complete search history.

(56) References Cited

U.S. PATENT DOCUMENTS 5,560,005 A 9/1996 Hoover et al.
5,778,385 A 7/1998 Pratt
(Continued)

FOREIGN PATENT DOCUMENTS

| EP | 3185144 A1 | 6/2017 |
|---|---|---|
| GB | 2354850 A | 4/2001 |
| WO | 2006/042314 A2 | 4/2006 |

OTHER PUBLICATIONS

Xiaohua Jia; A distributed Algorithm of Delay-Bounded Mulitcast Routing for Multimedia Applications in Wide Area Networks;ACM;1998;pp. 828-837.

(Continued)

*Primary Examiner* — Frantz B Jean
(74) *Attorney, Agent, or Firm* — Tarolli, Sundheim, Covell & Tummino LLP

(57) ABSTRACT

A multistage data sniffer instance can include a first stage that scans a given file for a set of data fields based on a configuration file for a selected format of the given file. The multistage data sniffer instance can also include a second stage that evaluates a value in each data filed in the set of data fields for the selected format to determine a validity of values in the set of data fields. The multistage data sniffer instance can further include a third stage that extracts data within the plurality of fields of the given file, aggregates the data based on a predetermined set of rules defined in the configuration file and outputs a data to a data mart database characterizing the aggregated data.

22 Claims, 5 Drawing Sheets

(51) Int. Cl.
*H04L 51/04* (2022.01)
*H04L 67/55* (2022.01)
*H04W 4/14* (2009.01)

(56) References Cited

U.S. PATENT DOCUMENTS

| | | |
|---|---|---|
| 6,199,068 B1 | 3/2001 | Carpenter |
| 6,904,360 B2 | 6/2005 | Pechatnikov et al. |
| 7,076,541 B1 | 7/2006 | Burstein et al. |
| 7,325,042 B1 | 1/2008 | Soscia et al. |
| 7,391,735 B2 | 6/2008 | Johnson |
| 2003/0208493 A1 | 11/2003 | Hall et al. |
| 2005/0108206 A1 | 5/2005 | Lam et al. |
| 2005/0216917 A1 | 9/2005 | Krishnaswamy et al. |
| 2006/0143220 A1 | 6/2006 | Spencer, Jr. |
| 2006/0161590 A1 | 7/2006 | Cahill et al. |
| 2007/0016897 A1 | 1/2007 | Todd |
| 2007/0130176 A1 | 6/2007 | Kawabe et al. |
| 2007/0299854 A1 | 12/2007 | Bohlmann et al. |
| 2008/0016059 A1 | 1/2008 | Henkin et al. |
| 2008/0021861 A1 | 1/2008 | Fitzsimons et al. |
| 2008/0033968 A1 | 2/2008 | Quan et al. |
| 2008/0071735 A1 | 3/2008 | Harrison et al. |
| 2008/0082614 A1 | 4/2008 | Bedi et al. |
| 2010/0211539 A1* | 8/2010 | Ho .................. G06F 16/972 707/602 |
| 2020/0167362 A1* | 5/2020 | Punuru ............. G06F 16/25 |
| 2021/0109944 A1* | 4/2021 | Adibowo ......... G06F 16/2471 |
| 2021/0152650 A1* | 5/2021 | Arivazhagan ..... G06F 3/067 |
| 2021/0200781 A1* | 7/2021 | Golden ............. G06K 9/726 |

OTHER PUBLICATIONS

International Search Report for corresponding PCT/US2021/034703 dated Sep. 7, 2021.

* cited by examiner

MULTISTAGE DATA SNIFFER FOR DATA EXTRACTION

TECHNICAL FIELD

This disclosure relates to data extraction. More particularly, this disclosure relates to a multistage data sniffer that extracts data.

BACKGROUND

Data extraction is the act or process of retrieving data from (usually unstructured or poorly structured) data sources for further data processing or data storage (data migration). The import into the intermediate extracting system is thus usually followed by data transformation and possibly the addition of metadata prior to being exported to another stage in the data workflow. The term data extraction can be applied when (experimental) data is first imported into a computer from primary sources, like measuring or recording devices.

Some unstructured data sources include web pages, emails, documents, PDFs, scanned text, mainframe reports, spool files, classifieds, etc. which is further used for sales or marketing leads. Extracting data from these unstructured sources has grown into a considerable technical challenge whereas historically data extraction has had to deal with changes in physical hardware formats, the majority of current data extraction deals with extracting data from these unstructured data sources, and from different software formats.

SUMMARY

One example relates to a non-transitory machine readable medium having machine executable instructions comprising a multistage data sniffer instance. The multistage data sniffer instance can include a first stage that scans a given file for a set of data fields based on a configuration file for a selected format of the given file. The multistage data sniffer instance can also include a second stage that evaluates a value in each data filed in the set of data fields for the selected format to determine a validity of values in the set of data fields. The multistage data sniffer instance can further include a third stage that extracts data within the plurality of fields of the given file, aggregates the data based on a predetermined set of rules defined in the configuration file and outputs data to a data mart database characterizing the aggregated data.

Another example relates to a system for extracting data. The system can include a non-transitory memory having machine executable instructions and a processing unit for accessing the memory and executing the machine executable instructions. The machine executable instructions can include a multistage data sniffer that executes a plurality of multistage data sniffer instances in parallel. Each multistage data sniffer instance can include a first stage that scans a given file extracted from a predetermined location for required data fields and optional data fields in a set of data fields based on a configuration file defining a selected format of the given file. Each multistage data sniffer instance can also include a second stage that evaluates a value in each data filed in the set of data fields for the selected format to determine a validity of values in the set of data fields. Each multistage data sniffer instance can further include a third stage that extracts data within the plurality of fields of the given file, aggregates the data based on a predetermined set of rules defined in the configuration file and outputs a data to a data mart database characterizing the aggregated data.

Yet another example relates to a method for extracting data. The method can include executing, by a multistage data sniffer executing on a computing platform, a plurality of multistage data sniffer instances in parallel, wherein each multistage data sniffer instance executes a sub-method. The sub-method can include scanning a given file extracted from a predetermined location for required data fields and optional data fields in a set of data fields based on a configuration file defining a selected format of the given file. The sub-method can also include validating a value in each data filed in the set of data fields for the selected format to determine a validity of values in the set of data fields. The sub-method can further include extracting data within the plurality of fields of the given file and aggregating the data based on a predetermined set of rules defined in the configuration file. The sub-method can still further include outputting a data to a data mart database characterizing the aggregated data.

DETAILED DESCRIPTION

This disclosure relates to a multistage data sniffer that executes on a computing platform to extract data from multiple sources, such as files and/or databases. The multistage data sniffer can instantiate a plurality of multistage data sniffer instances that operate in parallel. Each such multistage data sniffer instance can include a first stage that scans a given file extracted from a predetermined location for required data fields and optional data fields in a set of data fields based on a configuration corresponding to a selected format of the given file. The selected format can be based, for example on a filename of the given file. The first stage can write content of the given file to a staging database.

Each multistage data sniffer instance can also include a second stage that retrieves the content of the given file from the staging database and evaluates a value in each data filed in the set of data fields for the selected format to determine a validity of values in the set of data fields. Validated content (e.g., the validated data values) can be written to a data warehouse database. Each multistage data sniffer instance can also include a third stage that extracts the validated data (or some subset thereof) and aggregates the extracted data based on a predetermined set of rules defined in the configuration file. The third stage can output data to a data mart database characterizing the aggregated data.

Additionally, the multistage data sniffer can instantiate a bulk data sniffer instance that augments the data mart database with data extracted from a source database. The bulk data sniffer instance can operate in parallel with the plurality of multistage data sniffer instances. Moreover, the aggregated data can be employed by a graphical user interface (GUI) generator to generate a graphical representation of the data in the data mart database. The multistage data extracted from the sources conforms to the known and excepted formats identified in the configuration file. Additionally, the multistage data sniffer allows parallel processing of the data extraction, avoiding the need for slow sequential operations.

Figure 1:
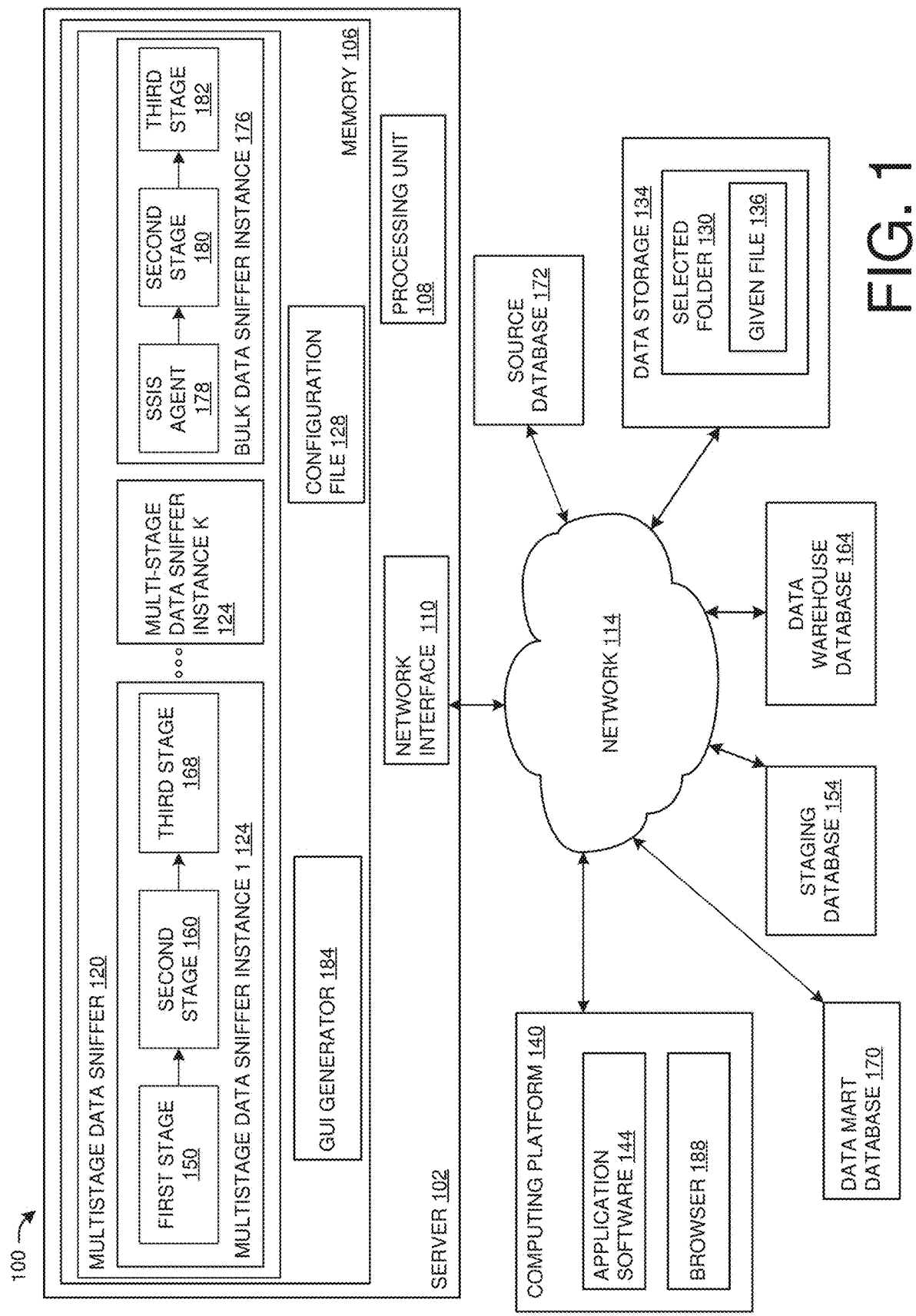
FIG. 1 illustrates an example of a system for extracting data from multiple sources.

FIG. 1 illustrates an example of a system 100 for automated data extraction. The system 100 can include a server 102 (e.g., a computing platform) that can include a memory 106 for storing machined readable instructions and data and a processing unit 108 for accessing the memory 106 and executing the machine readable instructions. The memory 106 represents a non-transitory machine readable memory (or other medium), such as random access memory (RAM), a solid state drive, a hard disk drive or a combination thereof. The processing unit 108 can be implemented as one or more processor cores. The server 102 can include a network interface 110 (e.g., a network interface card) configured to communicate with other computing platforms via a network 114, such as a public network (e.g., the Internet), a private network (e.g., a local area network (LAN)) or a combination thereof (e.g., a virtual private network).

The server 102 could be implemented in a computing cloud. In such a situation, features of the server 102, such as the processing unit 108, the network interface 110, and the memory 106 could be representative of a single instance of hardware or multiple instances of hardware with applications executing across the multiple of instances (i.e., distributed) of hardware (e.g., computers, routers, memory, processors, or a combination thereof). Alternatively, the server 102 could be implemented on a single dedicated server or workstation.

The memory 106 can include a multistage data sniffer 120. The multistage data sniffer 120 can execute K number of multistage data sniffer instances 124, where K is an integer greater than or equal to one. The K number of multistage data sniffer instances 124 can operate in parallel to expedite the data extraction. FIG. 1 illustrates details of the first multistage data sniffer instance 124 (multistage data sniffer 1), but it is understood that the second to Kth multistage data sniffer instances 124 can operate in a similar manner.

The multistage data sniffer 120 can access a configuration file 128 that is stored in the memory 106. The configuration file 128 can define parameters for the data extraction. In particular, the configuration file 128 can identify a selected folder 130 (e.g., a directory) or multiple selected folders that are stored in a data storage 134. The multistage data sniffer 120 is configured/programmed to detect a change to a given file 136 in the selected folder 130. For instance, the multistage data sniffer 120 can be configured to query the selected folder 130 periodically (e.g., every ten minutes or less) and/or asynchronously for changes to files in the selected folder 130. The change to the given file 136 could be, for example, an indication that the given file 136 has been created in the selected folder 130, a renaming of the given file and/or a modification to contents of the given file.

As an example, a computing platform 140 can be employed by an end-user to change the given file 136. The computing platform 140 can communicate on the network 114. The computing platform 140 can be implemented, for example, as a desktop computer (e.g., a workstation), a laptop computer or a mobile computing device (e.g., a tablet computer or a smart phone). The computing platform 140 can include a non-transitory memory for storing machine executable instructions and a processing unit (e.g., one or more processor cores) to access the memory of the computing platform 140 and execute the machine readable instructions.

The computing platform 140 can include application software 144 (e.g., an app) that is employable to generate and/or modify the given file 136. As some examples, the application software 144 can be implemented as a spreadsheet program, a word processor, a presentation program, a desktop publishing application or any application that is employable to generate and/or modify consumable content. The application software 144 can be employed to access the selected folder 130 of the data storage 134 to generate and/or modify the given file 136 stored therein.

In response to detecting a change to the given file 136, the multistage data sniffer 120 can examine the filename of the folder to determine if the filename includes a string that matches a string defined for a format of a plurality of formats in the configuration file 128 that can be referred to as a selected format. More particularly, the configuration file 128 can include a plurality of strings that each correspond to a format. As some examples, the configuration file can include strings that correspond to sales spreadsheets, accounts receivable charts, whitepapers, advertisements, etc. In a given example, hereinafter "given example", the string in the configuration file 128 can be "sales" corresponding to a sales chart, and the given file 136 is representative of a spreadsheet. If the given file 136 does not include a string that matches a string identified in the configuration file 128, the given file 136 can be ignored. Additionally, upon detecting a change to the given file 136 (e.g., renaming the given file), the multistage data sniffer 120 can re-examine the filename of the given file 136 in an attempt to identify the selected format.

In response to identifying the selected format for the given file 136, the multistage data sniffer 120 can instantiate a multistage data sniffer instance 124. In the present example, it is presumed that the multistage data sniffer 120 instantiates the first multistage data sniffer instance 124 to extract data from the given file 136, but in other examples, any of the K number of multistage data sniffer instances 124 can extract data from the given file 136.

A first stage 150 of the first multistage data sniffer instance 124 can execute a data field validation operation to validate the presence of a set of data fields for the selected format that can be defined in the configuration file 128. During the data field validation operation, the first stage 150 can scan the given file 136 for required data fields (and optional data fields, in some examples) in a set of data fields defined in the configuration file 128 for the selected format. The data fields could vary based on the nature of the selected format. For instance, continuing with the given example, one field could be implemented as "weekly sales" and another field could be "sold equipment". Yet another field in the given example could be "salesperson name". Additionally, the set of data fields can include required data fields and optional data fields. The optional data fields can be data fields that may or may not be present in the given file 136 and the required data fields can be data fields that must be present in the given file 136. In the given example, a required data field could be, for example, the "salespersons name" field and an optional field could be "expenses".

The data field validation operation of the first stage 150 determines whether the required data fields in the set of data fields of the selected format are present in the given file 136. If the first stage 150 detects that one or more of the required data fields are missing, the first stage 150 can generate an error message that is provided in a notification for a recipient identified in the configuration file 128. The recipient could be, for example, a user associated with the computing platform 140 employed to generate the given file 136 and/or a different user. The error message can identify the missing required data field or multiple missing required data fields. The notification that includes the error message can be provided as an email message, a push notification and/or as a short message service (SMS) message addressed to the recipient. In response to providing the notification, the first stage 150 can terminate the multistage data sniffer instance 124 that may be re-instantiated by the multistage data sniffer 120 in response to detecting a change to the given file 136 (e.g., wherein the given file 136 is modified to include the required data field).

Additionally, in some examples, if the first stage 150 detects that an optional data field of the set of data fields for the selected format is missing, the first stage 150 can generate a warning message. The warning message can be provided in a notification to the recipient identifying the missing optional data field. However, in response to detecting a missing optional data field, the first stage 150 does not terminate the first multistage data sniffer instance 124.

If the required fields of the set of data fields of the selected format are present, the first stage 150 of the first multistage data sniffer instance 124 writes content of the given file 136 to a record (or multiple records) in a staging database 154. In some examples, the staging database 154 can be implemented, for example as a search and query language (SQL) database that is accessible via the network 114. In other examples, the staging database 154 can be a database local to the server 102. Additionally, in some examples, the first stage 150 can write the results of the data field validation operation to a log file.

In some examples, periodically (e.g., every 10 minutes or less) and/or asynchronously a second stage 160 of the first multistage data sniffer instance 124 can access the staging database 154 and accesses the record associated with the given file 136. In other examples, the first stage 150 passes the content of the given file 136 to the second stage 160, such that the content may not be written to the staging database 154. In either situation, in response to receiving the content of the given file 136, the second stage 160 can execute a data value validation operation. During the data value validation operation, the second stage scans the content of the given file 136 for values in the set of data fields to determine if the values are valid (e.g., in acceptable form).

The validity for each data field can vary based on a type of the respective data field, and the validity can be defined by the configuration file 128. For instance, if a particular data field is a numerical value, the validity of the particular data field can be defined by a range of values. In the given example, the value for "weekly sales" could be a range greater than or equal to zero. Conversely, if a particular data field is a string, being in valid form may indicate that only letters are permissible. For instance, in the given example the valid form for value for "salesperson name" could allow only letters and spaces (e.g., no punctuation or numbers permitted).

If the second stage 160 detects that a data value (or multiple data values) of the set of data fields is not in a valid form, the second stage 160 can generate an error message that is provided in a notification for the recipient identified in the configuration file 128. The notification that includes the error message can be provided as an email message, a push notification and/or as an SMS message addressed to the recipient. In such a situation, the error message can indicate the deficiencies of the data value (e.g., extraneous characters and/or out of range). In response to providing the notification, the second stage 160 can terminate the first multistage data sniffer instance 124 that may be re-instantiated by the multistage data sniffer 120 in response to detecting a change to the given file 136 (e.g., wherein the given file 136 is modified to revise the value of the data field that is not in valid form).

If the values in the set of data fields are in valid form, the second stage 160 of the first multistage data sniffer instance 124 writes validated content (e.g., validated data values) of the given file 136 to a record (or multiple records) in a data warehouse database 164. In some examples, the data warehouse database 164 can be implemented, for example as a SQL database that is accessible via the network 114. In other examples, the data warehouse database 164 can be a database local to the server 102. Additionally, in some examples, the first stage 150 can write the results of the data field validation operation to a log file. In still other examples, the second stage 160 can pass contents of the given file 136 to a third stage 168 of the first multistage data sniffer instance 124.

In some examples, periodically (e.g., every 10 minutes or less) and/or asynchronously the third stage 168 of the first multistage data sniffer instance 124 can access the data warehouse database 164 and access the record associated with the given file 136 More particularly, the third stage 168 can access the data warehouse database 164 and can extract a subset of the validated content, which can be referred to as extracted data. The extracted data can be written to a data mart database 170. In some examples, the data mart database 170 can be an SQL database that is accessible via the network 114. In other examples, the data mart database 170 can be stored in the memory 106.

Moreover, the third stage 168 can aggregate the extracted data with data extracted from other sources, such as other files and/or a database. In some such examples, the extracted data can be aggregated with values of different fields in the same file (e.g., the given file 136) and/or values of fields form the different sources. Continuing with the given example, the extracted data could represent multiple instances of "weekly sales", which can be aggregated to generate a value for "monthly sales". Additionally or alternatively, in the given example, the field "weekly sales" can be aggregated with a sales report for other salespersons to generate a value for a "total weekly sales" for multiple salespersons.

In some examples, a large amount of data (e.g., bulk data) can be processed by the multistage data sniffer 120. For example, a source database 172 (e.g., an SQL database) can contain records with content for import and/or aggregation into the data mart database 170. In the given example, the records of the source database 172 can contain historical data with sales reports from archived records. In such a situation, the multistage data sniffer 120 can launch a bulk data sniffer instance 176 to import and/or aggregate the data in the source database 172 into the data mart database 170. Additionally, the multistage data sniffer 120 can write a log entry characterizing the importation and/or aggregation.

More particularly, the bulk data sniffer instance 176 can include an SQL Server Integration Services (SSIS) agent 178 (or another type of an agent) that can be programmed to pull data from the source database 172 and transfer the pulled data to the staging database 154. Additionally, the SSIS agent 178 can write details of the transfer to a log file. The bulk data sniffer instance 176 can also include a second stage 180 and a third stage 182 that can be implemented in a manner similar to the second stage 160 and the third stage 168 of each multistage data sniffer instance 124. That is, the second stage 180 of the bulk data sniffer instance 176 can execute the data value validation operation on the data transferred to the staging database 154 from the source database 172 and write validated content to the data warehouse database 164. Additionally, the third stage 182 can extract a subset of the validated content from the data warehouse database 164 and write and/or aggregate the extracted data to the data mart database 170 and generate a log entry characterizing the operation.

Over time, more and more data can be aggregated in the data mart database 170 from multiple sources (e.g., multiple files in the selected folder 130 and/or from the source database 172). As the data grows, it becomes helpful to organize the data in a visual format. Accordingly, a graphical user interface (GUI) generator 184 can access the data mart database 170 and generate a graphical representation of the aggregated extracted data. In some examples, the GUI generator 184 can be implemented as a web page generator and/or a web server. In such a situation, the graphical representation of the aggregated extracted data can be in a graphical chart, a dashboard, etc. Additionally, the GUI generator 184 can provide the graphical representation of the extracted data to a requesting device, such as a web browser 188 executing on the computing platform 140 (or executing on a different computing platform).

Figure 2:
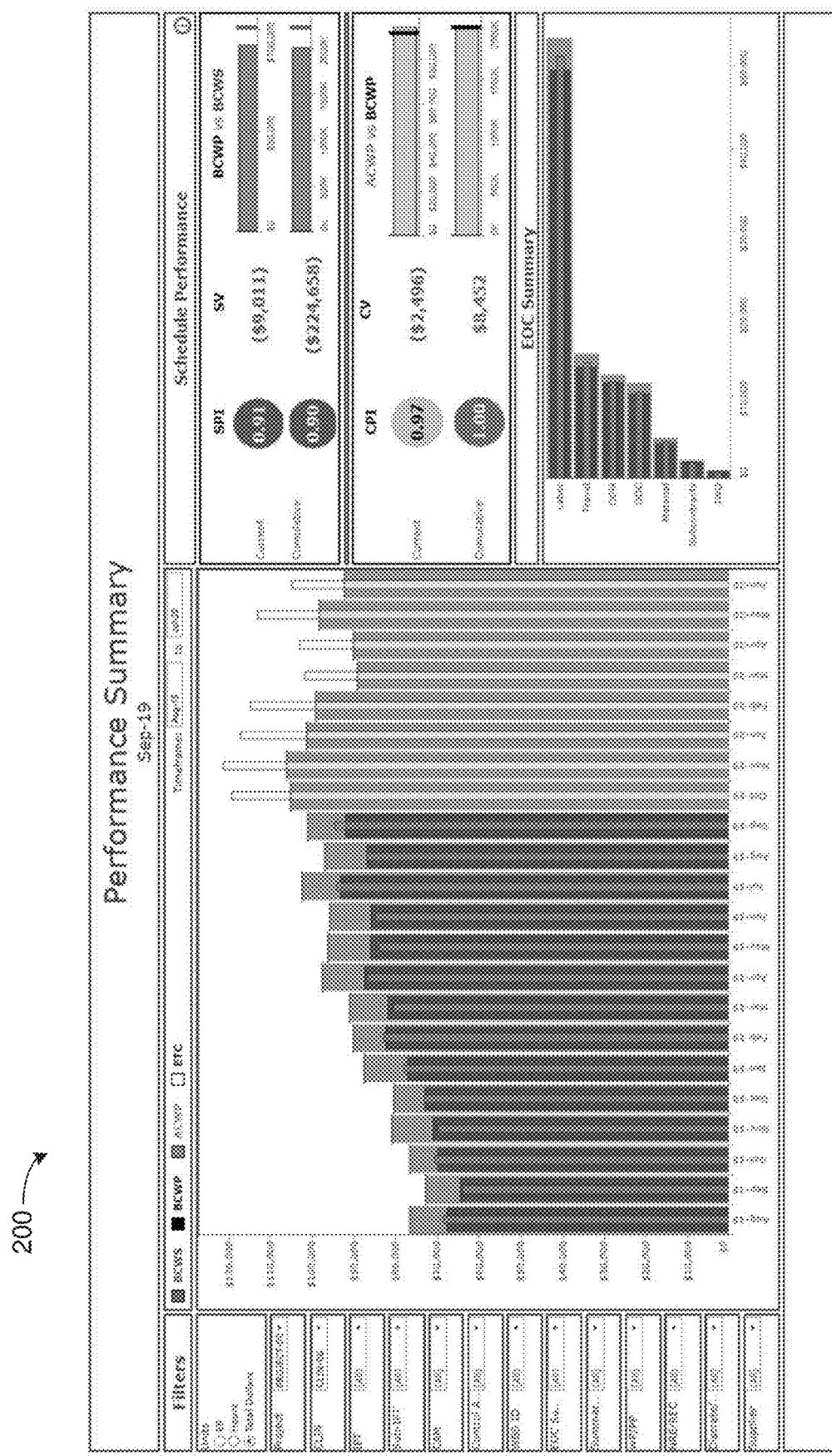
FIG. 2 illustrates an example of a dashboard generated based on extracted data.

FIG. 2 illustrates an example of a dashboard 200 that could be implemented as the graphical representation of the extracted data generated by the GUI generator 184 of FIG. 1. The dashboard 200 includes project costs for a particular project that represent aggregated values from multiple sources. Moreover, the dashboard 200 includes multiple charts demonstrating multiple ways that the data can be visually represented. The types and number of charts employed will vary based on the type of data extracted from the various sources.

Referring back to FIG. 1, by employing the system 100, data can be extracted and aggregated from multiple sources and organized in graphical form. Moreover, as noted each of the K number of multistage data sniffer instances 124 can operate in parallel. Thus, each of the K number of multistage data sniffer instances 124 (or some subset thereof) can contemporaneously extract data from a file independently, such as the given file 136 in response to an update to the file. In this manner, the need for sequential processing of files is obviated. Furthermore, each of the K number of multistage data sniffer instances 124 includes an instance of the first stage 150, the second stage 160 and the third stage 168. Accordingly, the operations of the first stage 150, the second stage 160 and the third stage 168 can be coordinated, thereby avoiding the need for three separate manually controlled processes. Additionally, the data field validation operation executed by the first stage 150 and the data value validation operation executed by the second stage 160 of the K number of multistage data sniffer instances 124 ensures that data is provided in a consistent format, and that the data is complete.

Figure 3:
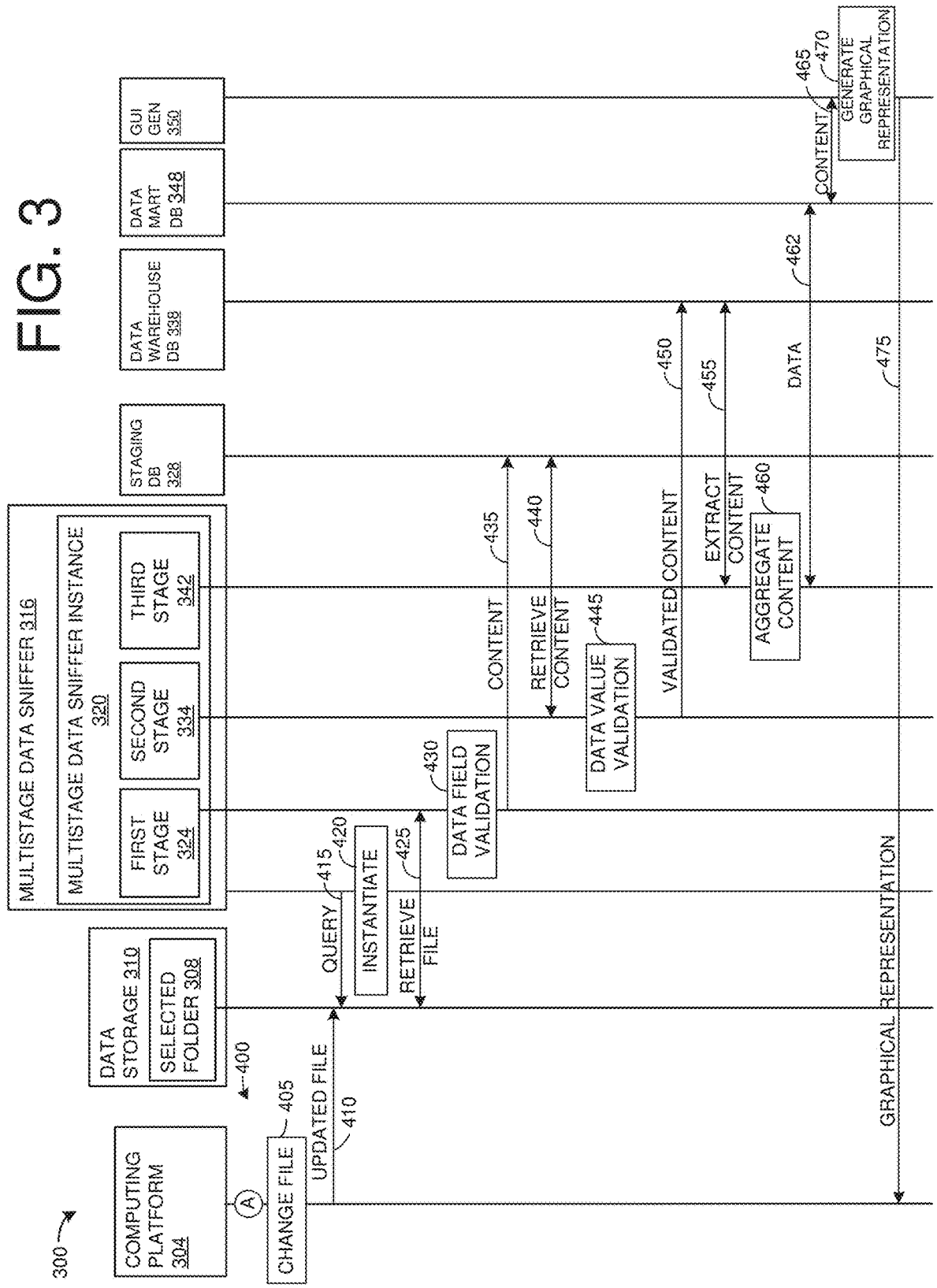
FIG. 3 illustrates a timing diagram of an example method for extracting data from a file.

FIG. 3 illustrates a timing diagram depicting an example of a timing of operations by a system 300 for executing a method 400 for automated data extraction. The system 300 can be employed to implement the system 100 of FIG. 1. Thus, the system 300 can include a computing platform 304 (e.g., an end-user device) with application software for accessing and updating files.

At 405, the application software executing on the computing platform 304 can be employed to change a file to generate or modify an updated file. The change to the given file 136 could be, for example, a change to content and/or a filename of the file or generation of a new file. At 410, the updated file is written to a selected folder 308 in a data storage 310 via a network (e.g., a private network and/or a public network, such as the Internet).

At 415, the multistage data sniffer 120 is configured/programmed to periodically and/or asynchronously query the selected folder 308 to detect the updated file in the selected folder 308. If the updated file includes a string that corresponds to an identifier of a selected format in the configuration file, at 420, the multistage data sniffer 316 can instantiate a multistage data sniffer instance 320. At 425, a first stage 324 of the multistage data sniffer instance 320 retrieves a copy of the updated file from the selected folder 308.

At 430, the first stage 324 of the multistage data sniffer instance 320 can execute a data field validation operation on the updated file. The data field validation operation can verify that the updated file includes each required data field in a set of data fields for the selected format. If the retrieved file is missing one or more of the required data fields, the first stage 324 of the multistage data sniffer instance 320 generates a notification for a recipient (identified in the configuration file) describing the deficiencies (e.g., as an error message), and terminates the multistage data sniffer instance 320, wherein the method 400 returns to node 'A'. Conversely, if the data field validation operation indicates that the updated file includes each required field in the set of data fields for the selected format, at 435, the first stage 324 writes content of the updated file to a staging database 328.

At 440, a second stage 334 of the multistage data sniffer instance 320 can periodically and/or asynchronously retrieve the newly written content from the staging database 328. At 445, the second stage 334 of the multistage data sniffer instance 320 can execute a data value validation operation on the retrieved content. The data value validation operation can determine whether values in the data fields of the retrieved content are in valid form (e.g., valid numerical range, proper characters in strings, etc.). If one or more data values is not in valid form, the second stage 334 of the multistage data sniffer instance 320 can generate a notification for the recipient indicating the deficiencies of the updated file. In such a situation, the second stage 334 can terminate the multistage data sniffer instance 320 and the method 400 can return to node 'A'. If the values in the retrieved content are in valid form, at 450, the second stage 334 can write validated content to a data warehouse database 338.

At 455, a third stage 342 of the multistage data sniffer instance 320 can periodically and/or asynchronously extract content from the newly written validated content from the data warehouse database 338. The extracted content can be, for example, a subset of the validated content written to the data warehouse database 338.

At 460, the third stage 342 of the multistage data sniffer instance 320 can aggregate the extracted content with other content in a data mart database 348, and at 462, the data can be written to the data mart database 348. (e.g., augment content in the data mart database). At 465, the content from data mart database 348 can be provided and/or retrieved by a GUI generator 350. At 470, the GUI generator 350 can generate a graphical representation of the aggregated data. At 475, the graphical representation of the aggregated data (e.g., a dashboard and/or a chart) can be provided to the computing platform 304 or a different computing platform via the network (e.g., as a web page) for output on a display.

Figure 4:
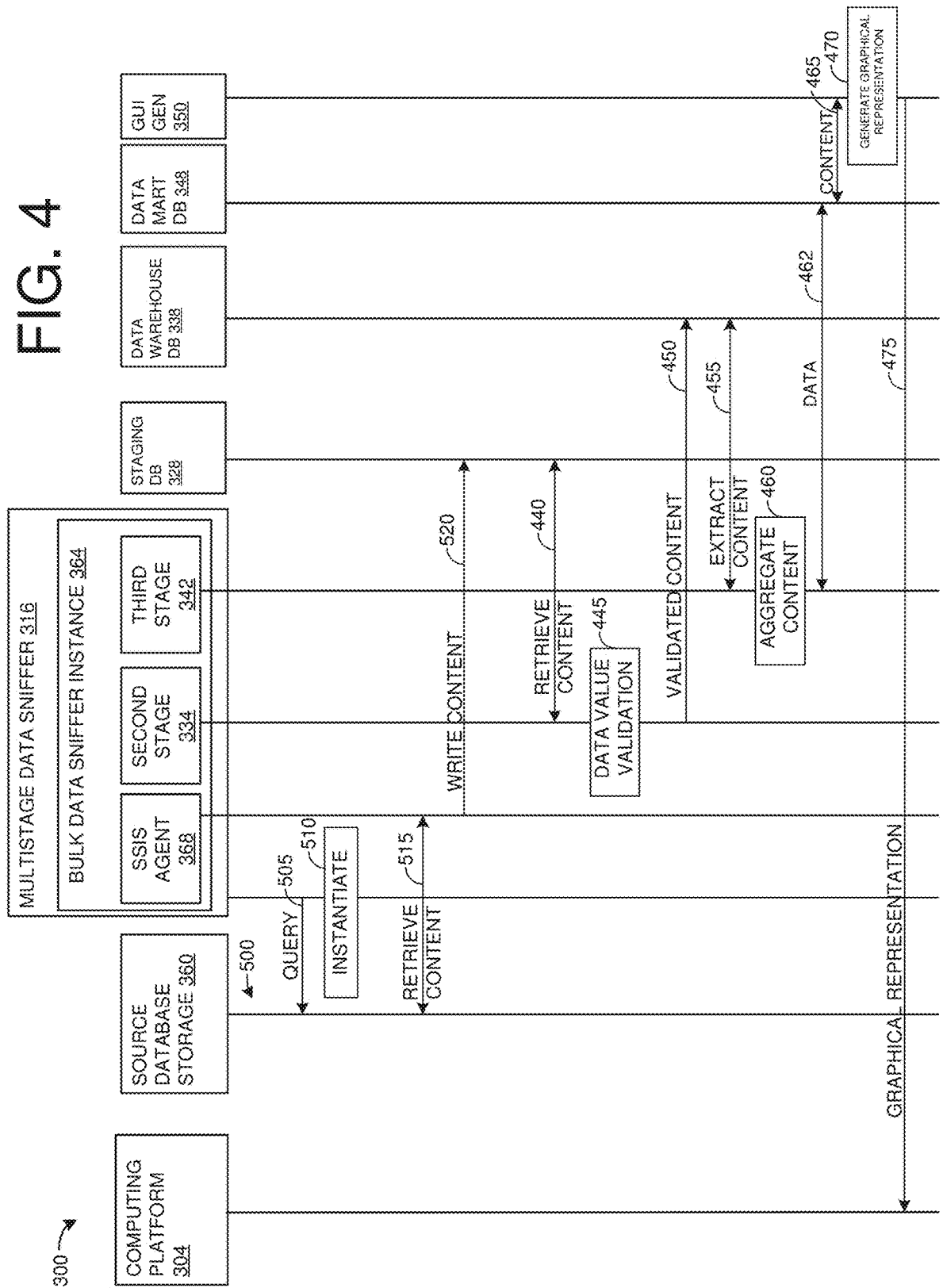
FIG. 4 illustrates another timing diagram of an example method for extracting data from a database.

FIG. 4 illustrates another timing diagram depicting an example of a timing of operations by the system 300 of FIG. 3 for executing a method 500 for automated data extraction. For purposes of simplification of explanation, the same reference numbers are employed in FIGS. 3 and 4 to denote the same structure or operation. Moreover, for purposes of simplification of explanation, some reference numbers are not reintroduced. The method 500 can be employed to implement a bulk data extraction operation from a database. The method 500 can operate contemporaneously with the method 400 of FIG. 3.

At 505, periodically and/or asynchronously, the multistage data sniffer 316 can query a source database 360 for updated (e.g., new or modified) content. In response to detecting updated content, at 510, the multistage data sniffer 316 can instantiate a bulk data sniffer instance 364. At 515, an SSIS agent 368 of the bulk data sniffer instance 364 can retrieve content from the source database 360. At 520, the SSIS agent 368 of the bulk data sniffer instance 364 can write the content to the staging database 328.

The bulk data sniffer instance 364 also includes an instance of the second stage 334 and the third stage 342 that operate in the manner described with respect to FIG. 3. For purposes of simplification of explanation, those operations are not repeated.

As demonstrated in FIGS. 3 and 4, the system 300 can be employed to automatically extract data from different sources through the methods 400 and 500. Moreover, multiple instances of the method 400 and the method 500 can execute in parallel. Thus, the system 300 avoids the need to implement slow serialized operations to extract data.

Figure 5:
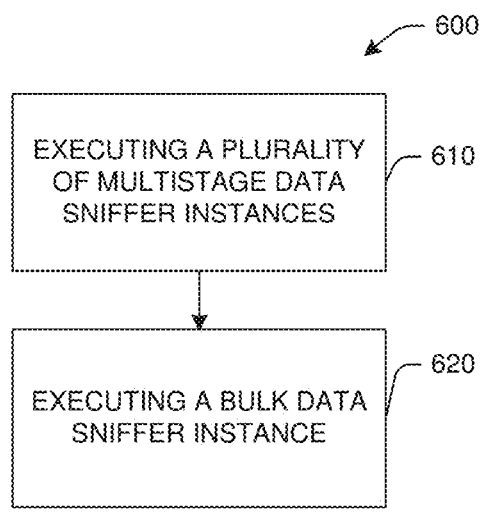
FIG. 5 illustrates a flowchart of an example method for extracting data.
Figure 6:
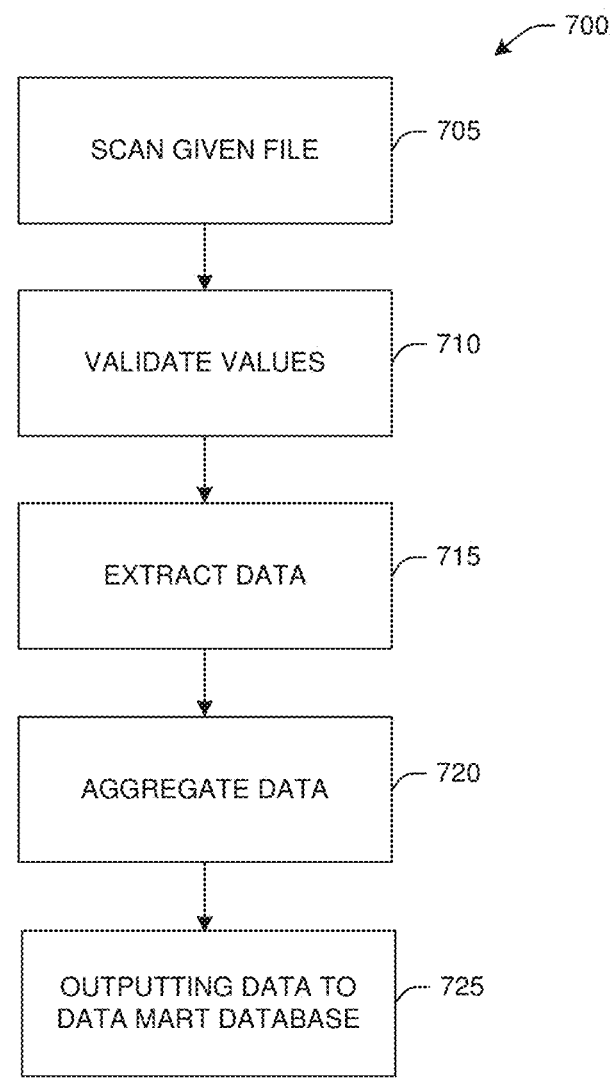
FIG. 6 illustrates a flowchart of an example sub-method for extracting data.

In view of the foregoing structural and functional features described above, example methods will be better appreciated with reference to FIGS. 5 and 6. While, for purposes of simplicity of explanation, the example methods of FIGS. 5 and 6 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIGS. 5 and 6 can be implemented as instructions stored in a non-transitory machine-readable medium. The instructions can be accessed by a processing unit and executed to perform the methods disclosed herein.

FIG. 5 illustrates a flow chart of an example method 600 for extracting data. The method 500 can be implemented, for example, by a multistage data sniffer executing on a computing platform, such as the multistage data sniffer 120 executing on the server 102 of FIG. 1. At 610, the multistage data sniffer can execute a plurality of multistage data sniffer instances (e.g., the K number of multistage data sniffer instances 124 of FIG. 1) in parallel. Each multistage data sniffer instance can execute a sub-method for extracting data from a given file. At 620, the multistage data sniffer can execute a bulk data sniffer instance (e.g., the bulk data sniffer instance 176 of FIG. 1) in parallel with the plurality of multistage data sniffer instances. The bulk data sniffer instance can augment the data mart database with data extracted from a source database.

FIG. 6 illustrates a flowchart of an example sub-method 700 for extracting data from a given file. The sub-method 700 can represent the sub-method executed by a corresponding multistage data sniffer instance of the plurality of multistage data sniffer instances described with respect to the method 600 of FIG. 5. Thus, there can be multiple instances of the sub-method 700 operating in parallel.

At 705, a first stage (e.g., the first stage 150 of FIG. 1) of the multistage data sniffer instance can scan a given file (e.g., the given file 136) extracted from a predetermined location for required data fields and optional data fields in a set of data fields based on a configuration file defining a selected format of the given file during a data field validation operation. At 710, a second stage (e.g., the second stage 160 of FIG. 1) of the multistage data sniffer instance can execute a data value validation operation to validate a value in each data filed in the set of data fields for the selected format to determine a validity of values in the set of data fields. At 715, a third stage (e.g., the third stage 168 of FIG. 1) of the multistage data sniffer instance can extract data within the plurality of fields of the given file. At 720, the third stage can aggregate the data based on a predetermined set of rules defined in the configuration file. At 725, the third stage can output data to a data mart database characterizing the aggregated data. Content from the data mart database can be employed, for example by a GUI generator (e.g., the GUI generator 184 of FIG. 1) to generate a dashboard and/or a chart that graphically represents content (e.g., data) in the data mart database that can be output on a remote computing platform (e.g., via a browser or application software).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions comprising a multistage data sniffer instance comprising:
   a first stage that scans a given file for a set of data fields based on a configuration file for a selected format of the given file in response to a change in the given file;
   a second stage that, in response to receiving the scanned set of data fields from the given file, evaluates a value in each data field in the set of data fields for the selected format to determine a validity of values in the set of data fields and writes a given value in the set of data fields to a record of validated content stored in a data warehouse database in response to determining that the given value is valid; and
   a third stage that extracts data a subset of data from the record of validated content, aggregates the subset of data with another set of extracted data based on a predetermined set of rules defined in the configuration file and outputs a data to a data mart database characterizing the aggregated data, wherein the another set of extracted data is another subset of data from the record of validated content and/or values of data fields from another file.

2. The non-transitory machine readable medium of claim 1, further comprising a graphical user interface (GUI) generator that generates a dashboard and/or a chart based on content in the data mart database characterizing the aggregated data from the given file and the another file.

3. The non-transitory machine readable medium of claim 1, wherein the second stage of the multistage data sniffer instance generates an error message in response to detecting that at least one data field in the set of data fields is missing.

4. The non-transitory machine readable medium of claim 3, wherein the error message is provided in a notification to a contact through one or more of an email, a push notification and a short message service (SMS) message.

5. The non-transitory machine readable medium of claim 1, wherein the multistage data sniffer instance is a component of a multistage data sniffer that identifies the selected format for the given file in a predetermined location based on a filename of the given file.

6. The non-transitory machine readable medium of claim 5, wherein the predetermined location is based on the configuration file.

7. The non-transitory machine readable medium of claim 5, wherein the selected format is selected from a plurality of formats defined in the configuration file.

8. The non-transitory machine readable medium of claim 1, wherein the multistage data sniffer instance is a component of a multistage data sniffer that instantiates a bulk data sniffer instance, the bulk data sniffer instance comprising an agent that extracts data from a source database and aggregates the extracted data based on the predetermined set of rules defined in the configuration file.

9. A system for extracting data, the system comprising:
a non-transitory memory having machine executable instructions; and
a processing unit for accessing the memory and executing the machine executable instructions, the machine executable instructions comprising a multistage data sniffer that executes a plurality of multistage data sniffer instances in parallel, each multistage data sniffer instance comprising:
a first stage that, in response to a change in a given file, scans the given file extracted from a predetermined location for required data fields and optional data fields in a set of data fields based on a configuration file defining a selected format of the given file;
a second stage that, in response to receiving the scanned set of data fields from the given file, evaluates a value in each data field in the set of data fields for the selected format to determine a validity of values in the set of data fields and writes a given value in the set of data fields to a record of validated content stored in a data warehouse database in response to determining that the given value is valid; and
a third stage that extracts a subset of data from the record of validated content, aggregates the subset of data with another set of extracted data based on a predetermined set of rules defined in the configuration file and outputs a data to a data mart database characterizing the aggregated data, wherein the another set of extracted data is another set of data from the record of validated content and/or values of data fields from another file.

10. The system of claim 9, further comprising a graphical user interface (GUI) generator that generates a dashboard and/or a chart based on content in the data mart database.

11. The system of claim 9, wherein the second stage of each multistage data sniffer instance generates an error message in response to detecting that at least one data field in the set of data fields is missing.

12. The system of claim 11, wherein the error message is provided in a notification to a contact through one or more of an email, a push notification and a short message service (SMS) message.

13. The system of claim 9, wherein the multistage data sniffer identifies the selected format for the given file in a predetermined location based on a filename of the given file.

14. The system of claim 13, wherein the predetermined location is based on the configuration file.

15. The system of claim 14, wherein the selected format is selected from a plurality of formats defined in the configuration file.

16. The system of claim 9, wherein the multistage data sniffer instantiates a bulk data sniffer instance comprises an agent that extracts data from a source database and aggregates the extracted data based on the predetermined set of rules defined in the configuration file.

17. A method for extracting data, the method comprising:
executing, by a multistage data sniffer executing on a computing platform, a plurality of multistage data sniffer instances in parallel, wherein each multistage data sniffer instance executes a sub-method comprising:
scanning a given file extracted from a predetermined location for required data fields and optional data fields in a set of data fields based on a configuration file defining a selected format of the given file in response to a change in the given file;
validating, in response to scanning the set of data fields of the given file, a value in each data filed in the set of data fields for the selected format to determine a validity of values in the set of data fields;
writing, in response to determining the validity of values in the set of data fields, a given value in the set of data fields to a record of validated content stored in a data warehouse database;
extracting a subset of data from the record of validated content;
aggregating the subset of data with another set of extracted data based on a predetermined set of rules defined in the configuration file, wherein the another set of extracted data is another subset of data from the record of validated content and/or values of data fields from another file; and
outputting data to a data mart database characterizing the aggregated data.

18. The method of claim 17, further generating a dashboard and/or a chart based on content of the data mart database.

19. The method of claim 17, further comprising:
executing, in parallel with the plurality of multistage data sniffer instances, a bulk data sniffer instance that augments the data mart database with data extracted from a source database.

20. The method of claim 17, wherein the selected format for each sub-method is selected based on a filename of a respective given file.

21. The non-transitory machine readable medium of claim 1, wherein the another set of extracted data are values of data fields from another file, the given file and another file comprising different instances of the set of data fields.

22. The non-transitory machine readable medium of claim 1, wherein the another set of extracted data are values of data fields from another file, the given file comprising the set of data fields and the another file comprising another set of data fields.

* * * * *